(12) United States Patent
Zindler

(10) Patent No.: US 6,263,899 B1
(45) Date of Patent: Jul. 24, 2001

(54) MIXING VALVES WITH CERAMIC FLOW CONTROL ELEMENTS

(75) Inventor: Jerrold Zindler, Brookline, MA (US)

(73) Assignee: Symmons Industries, Inc., Braintree, MA (US)

( * ) Notice: Subject to any disclaimer, the term of this patent is extended or adjusted under 35 U.S.C. 154(b) by 0 days.

(21) Appl. No.: 09/519,034

(22) Filed: Mar. 3, 2000

(51) Int. Cl.[7] .................................................. F16K 11/065
(52) U.S. Cl. ............................................................ 137/98
(58) Field of Search ........................ 137/98, 100, 625.4, 137/625.48, 595, 597

(56) References Cited

U.S. PATENT DOCUMENTS

| | | | | |
|---|---|---|---|---|
| 4,183,377 | * | 1/1980 | Bernat | 137/625.17 |
| 4,687,025 | * | 8/1987 | Kahle et al. | 137/625.17 |
| 5,299,593 | * | 4/1994 | Ottelli | 137/100 |
| 5,725,010 | * | 3/1998 | Marty et al. | 137/100 |
| 5,884,652 | * | 3/1999 | Yeh et al. | 137/98 |

* cited by examiner

Primary Examiner—Stephen M. Hepperle
(74) Attorney, Agent, or Firm—Pandiscio & Pandiscio

(57) ABSTRACT

A novel non-scald mixing valve is provided of the type that utilizes a pressure-balancing piston to sense a change in the set flow conditions and automatically open or closes orifice to compensate for the change, the valve being characterized by the use of ceramic valving elements to provide both the valve shut-off function and the temperature-ratioing function. The ceramic valving elements fulfill the requirement that the positive shut-off function must be accomplished up-stream of the sensing pressure-balancing piston in order to avoid the use of check valves in the hot and cold water supplies.

30 Claims, 11 Drawing Sheets

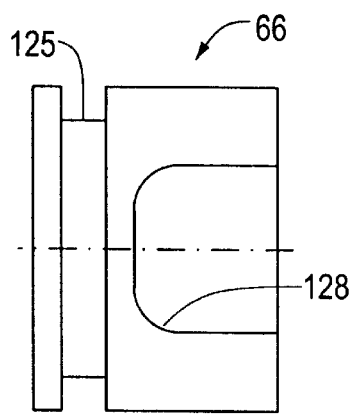
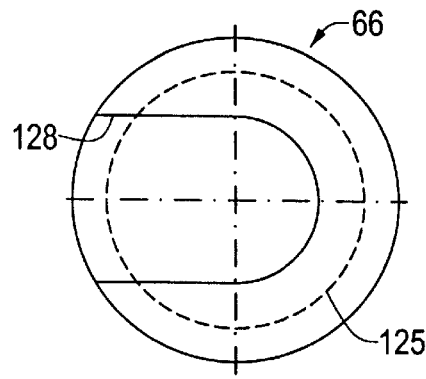
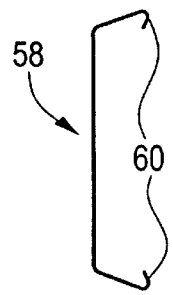
*FIG. 16*   *FIG. 17*   *FIG. 18*
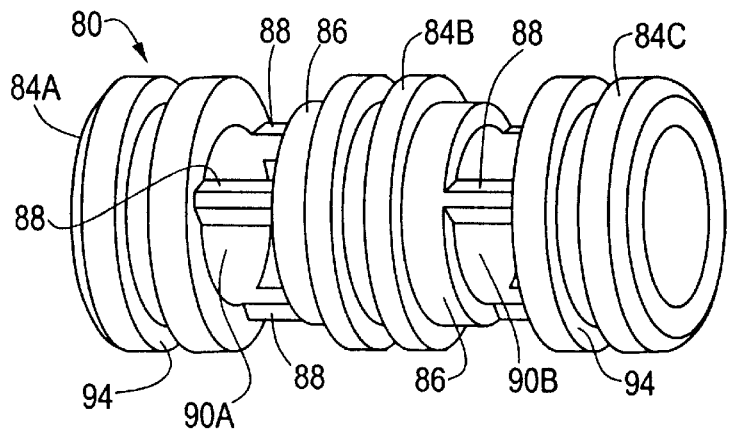
*FIG. 19*
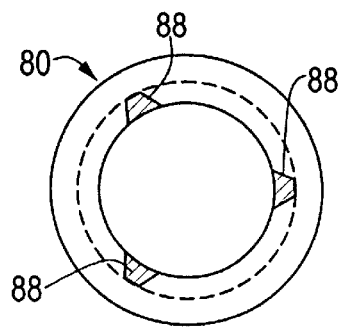
*FIG. 20*
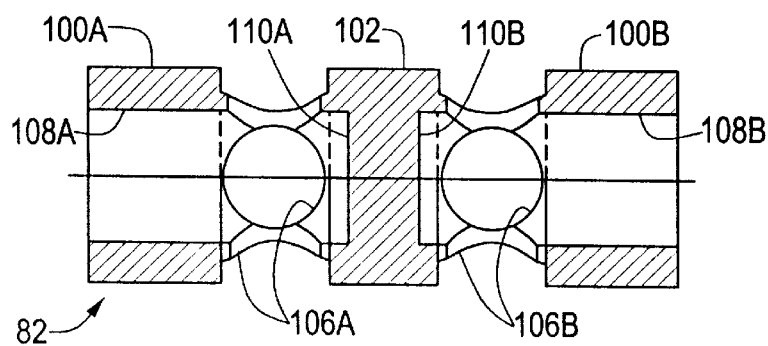
*FIG. 21*

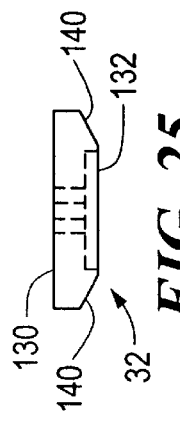
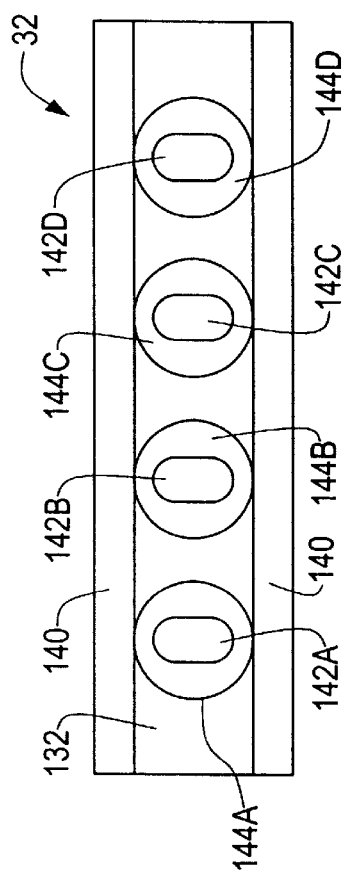
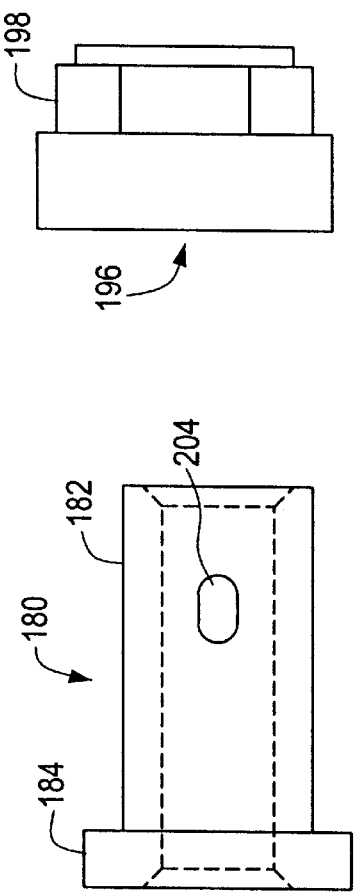
FIG. 25
FIG. 24
FIG. 28
FIG. 27
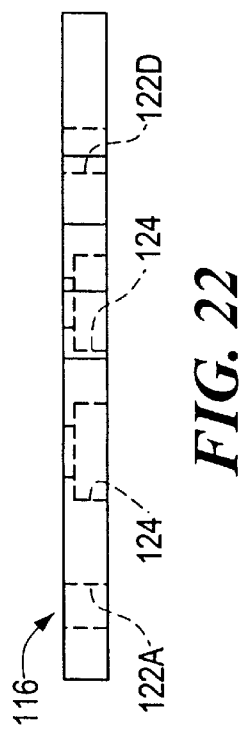
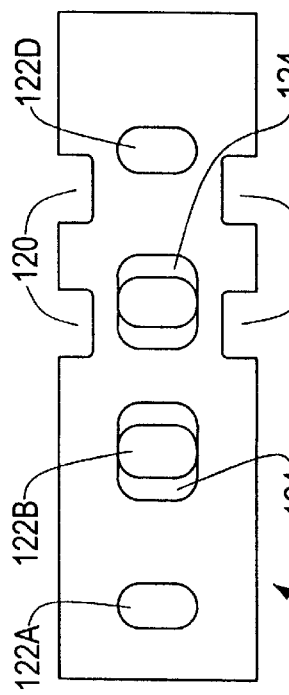
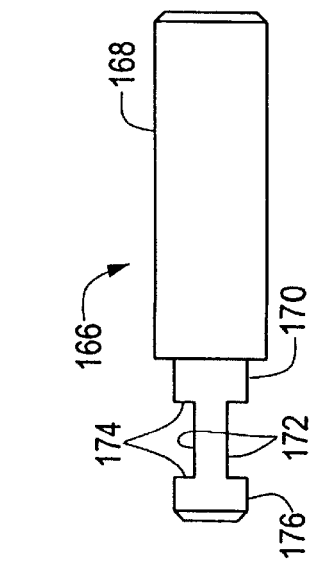
FIG. 22
FIG. 23
FIG. 26

OFF
FULL COLD
FULL HOT

RELATIVE CERAMIC POSITIONS

OFF
FULL COLD
WARM
FULL HOT

RELATIVE CERAMIC POSITIONS

MIXING VALVES WITH CERAMIC FLOW CONTROL ELEMENTS

This invention relates to improvements in non-scald mixing valves for shower and bath installations.

BACKGROUND OF THE INVENTION

Many variations on mixing valves for showers and baths have been developed and marketed. These include thermostatically controlled valves and pressure balanced valves. Typically a sensing-controlling element, such as a thermostatic expansion device or a pressure sensing-and-balancing piston senses a change in flow conditions and automatically opens or closes orifices to compensate for the change. To be effective the sensing-controlling element must "see" and act upon the incoming water flow upstream of any temperature setting element or mechanism.

Mixing valves of the type comprising a water pressure-sensing- and-balancing piston are exemplified by those disclosed in U.S. Pat. Nos. 2,308,127; 3,099,996; and 3,448,755. In such valves the hot and cold water sources are applied to opposite ends of the piston, and as pressure variations take place the piston is caused to move under the action of the pressure difference that occurs. The water flows through orifices controlled by the piston to another orifice pair that are set to proportion the hot/cold flow mix.

Since the sensing element, i.e., the water-pressure equalizing piston, must "see" and act upon the source water supply pressure, it must be connected directly across the hot and cold water supplies. Accordingly, if a leak occurs, hot water could be introduced into the cold water supply and vice-versa. To prevent that occurrence it is necessary to have a positive shut-off located up-stream of the sensing element. In mixing valves of the type described in the above-identified U.S. Patents, which type is more recently exemplified by the Temptrol® valves produced by Symmons Industries, Inc. of Braintree, Mass., this is accomplished by including two elastomeric "seats" that positively shut off the hot/cold supplies up-stream of the pressure balancing element. These seats are incorporated directly on the temperature setting, hot/cold ratioing element (the spindle assembly), obviating the need for separate check-valves as in many competing devices.

Also prior to the present invention it was recognized that use of ceramic members as valving elements in hot and cold water mixing valves offers several advantages, and a number of different water flow control products using ceramic components have been marketed. For example, kitchen and lavatory faucets using ceramic valving components have been developed and/or marketed by a number of companies, including Masco Corporation. See also U.S. Pat. No. 3,788,354, issued Jan. 29,1974 to Paul C. Symmons for Single Handle Water Mixing Valve. The use of ceramic valving elements in shower valves of the type having water pressure balancing piston elements is disclosed by U.S. Pat. No. 3,921,659 issued Nov. 25, 1975 to Charles J. Rudewick III for Modular Balanced Pressure Mixing Valve With Ceramic Valve Elements. Additionally Zurn Industries of Dallas, Tex. has marketed a shower valve using ceramic elements. However, to Applicant's knowledge, in the Zurn Company shower valve the ceramic elements are arranged so as to provide temperature-ratioing and shut-off control downstream of the pressure balancing element and, therefore, auxiliary check valves must be incorporated between the shower valve and the hot and cold water supplies to prevent backflow into the hot and cold water supply lines.

Non-scald shower and bath mixing valves using water pressure sensing-and-equalizing piston elements, notably valves having operating modes similar to those disclosed in said U.S. Pat. Nos. 2,308,127; 3,099,996; and 3,448,755, have achieved extensive commercial success because they have effectively eliminated the danger of accidental scalding resulting from a rapid change in water temperature as a consequence of a variation in water pressure, and also because their elastomeric seats positively shut off the hot and cold water supplies up-stream of the water pressure sensing and balancing means.

Nevertheless it has been recognized that there is a need to improve upon existing designs of non-scald mixing valves in a way that lowers manufacturing costs without any loss of non-scald protection and without requiring the use of check valves in the hot and cold water supply lines.

OBJECTS AND SUMMARY OF THE INVENTION

The primary object of this invention is to provide a new and improved pressure-balancing non-scald mixing valve that offers the advantages of lower manufacturing costs, uses virtually indestructible ceramic valving elements, and avoids the need for check valves to prevent backflow into the hot and cold supply lines.

Another important object of this invention is to provide a new and improved pressure-balancing non-scald mixing valve that is characterized by the use of ceramic elements to provide both the shut-off function and the temperature-ratioing function.

A further object is to provide a new and improved non-scald mixing valve of the type having a water pressure-equalizing piston for automatically opening and closing orifices to compensate for changes in cold or hot water pressure, characterized by the use of ceramic elements as means for accomplishing the shut-off function and means for accomplishing the temperature-ratioing function, while allowing the piston to be connected directly across the hot and cold water supplies.

The foregoing and other objects hereinafter rendered obvious are accomplished by utilizing a sliding ceramic face valve pair to provide both the required shut-off function and the temperature-ratioing function, with one ceramic element constituting a stator and the other a slider.

More specifically the new and improved mixing valve design comprises a valve body having cold and hot water supply ports, at least one mixed water outlet port and an opening for accommodating a mixing chamber member and a spindle assembly that extends into the mixing chamber assembly. The mixing chamber member is hollow and defines a mixing chamber having cold water inlet and transfer ports and hot water inlet and transfer ports, with its cold and hot water inlet ports communicating with the cold and hot water supply ports. Disposed in the mixing chamber is a ceramic stator having hot and cold water inlet orifices that communicate with the mixing chamber's cold and hot water inlet ports and cold and hot water outlet orifices that communicate with the mixing chamber's cold and hot water transfer ports. The spindle assembly comprises (1) a balancing piston block disposed within and movable bidirectionally lengthwise of the mixing chamber member, and (2) and a ceramic slider engaged with and movable with the balancing piston block. The balancing piston block has an internal chamber and four side orifices that open into said internal chamber. The slider has a cold water inlet orifice, a cold water exit orifice, a hot water inlet orifice, and a hot water exit orifice aligned with first, second, third and fourth ones respectively of the four side orifices of the piston block. The spindle assembly also includes a pressure- balancing piston disposed within and slidable bidirectionally along the balancing piston block's internal chamber, the piston having a cold and hot water side inlet ports and cold and hot water end outlet ports. The cold and hot water outlet ports of said piston are in constant communication with the cold and hot water transfer ports of said mixing chamber, while the piston's cold and hot water inlet ports move through varying degrees of alignment with the cold and hot water inlet ports respectively of the mixing chamber as the piston moves back and forth. The degree that the cold and hot water inlet ports of the piston are aligned with the cold and hot water inlet ports respectively of the mixing chamber is a function of the pressures of the hot and cold water supplied to the mixing chamber's cold and hot water inlet ports.

The spindle assembly further includes an actuating member in the form of a lead screw that is coupled to the balancing piston block, an internally threaded stem surrounding and in screw thread connection with the lead screw, and stem-retaining means attached to said valve body for permitting rotational but not axial movement of said stem, whereby rotation of the stem will cause the lead screw and the balancing piston block to move axially according to the direction of rotation of said stem. Axial movement of the balancing piston block by rotation of the stem causes the cold and hot water inlet orifices and the cold and hot water exit orifices of the slider to move into and out of varying degrees of alignment with the hot and cold water inlet orifices and the cold and hot water outlet orifices of the stator, including a first "Off" piston block position whereby at least the cold and hot water inlet orifices of the slider are blocked by portions of the stator, a second "Full Cold" water flow piston block position whereby the cold and hot water inlet orifices of the slider are aligned with the cold and hot water inlet orifices of the stator and the cold water exit orifice of the slider is aligned with the cold water outlet orifice of the stator, but the hot water exit orifice of the slider is blocked by a portion of the stator, and a third "Full Hot" water flow piston block position in which the cold water exit orifice of the slider is blocked by a portion of the stator and the hot water exit port of the slider is aligned with the hot water outlet port of the stator. In the first position, no water can flow through the valve. In the second position only cold water can flow through the valve. In the third position only hot water can flow through the valve. When the piston block is positioned intermediate those second and third positions, both cold and hot water can flow through the faucet, with the proportions of hot cold water depending upon the degree of alignment of slider and stator orifices.

Other features and advantages of the invention are explicitly disclosed or rendered obvious by the following detailed description which is to be considered together with the accompanying drawings.

THE DRAWINGS

FIG. 16 is a side view in elevation of the seal plug for the balancer porting block;

FIG. 17 is a plan view of the outer end of the seal plug;

FIG. 18 is a side view of a spring retainer clip for the seal plug;

FIG. 19 is a perspective view of a sleeve that slidably contains the pressure balancing piston;

FIG. 20 is a cross-sectional view of the same sleeve;

FIG. 21 is a longitudinal sectional view of the pressure balancing piston;

FIGS. 22 is a side view of the ceramic slider;

FIG. 23 is a bottom view of the ceramic slider;

FIG. 24 is a bottom view of the ceramic stator;

FIG. 25 is an end view of the stator;

FIG. 26 is a side view in elevation of the lead screw;

FIG. 27 is a side view in elevation of the stem member;

FIG. 28 is a side view in elevation of a stem retainer;

DETAILED DESCRIPTION OF THE INVENTION

Figure 2:
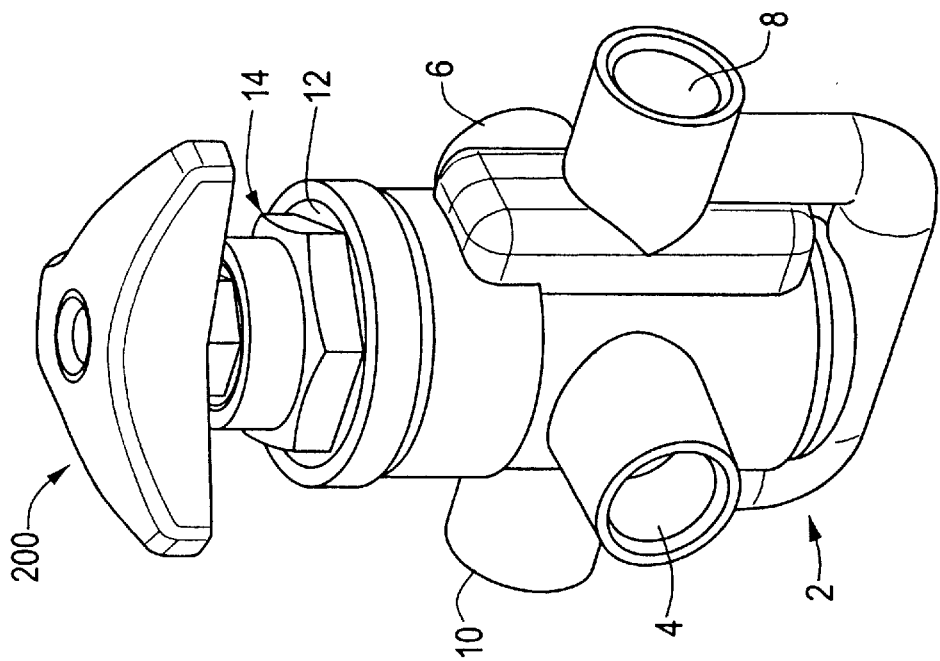
FIG. 2 is a view similar to FIG. 1 but with the valve rotated 90° from the position shown in FIG. 1.

Referring first to FIGS. 1–5, the illustrated embodiment of the invention comprises a valve body 2 preferably, but not necessarily, made of brass and having cold and hot water inlet ports 4 and 6 respectively, a first outlet port 8 adapted for connection to a bathtub water inlet and a second outlet port 10 adapted for connection to a shower head. Additionally the valve body has a large threaded opening 12 to accommodate a valve cap 14 that serves to retain within the valve body the working components hereinafter described.

Figure 4:
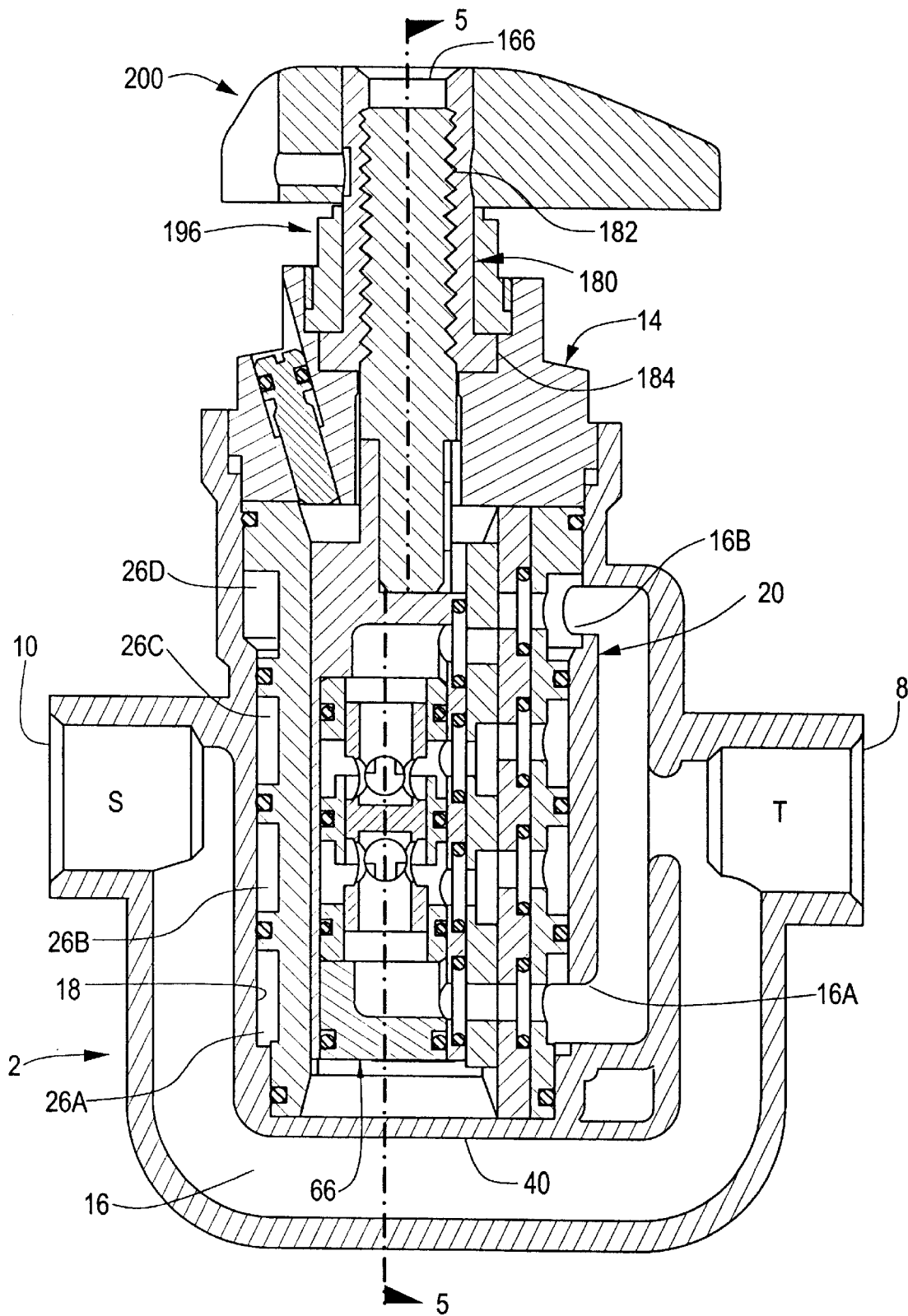
FIG. 4 is a sectional view in elevation taken along line 4—4 of FIG. 3.
Figure 5:
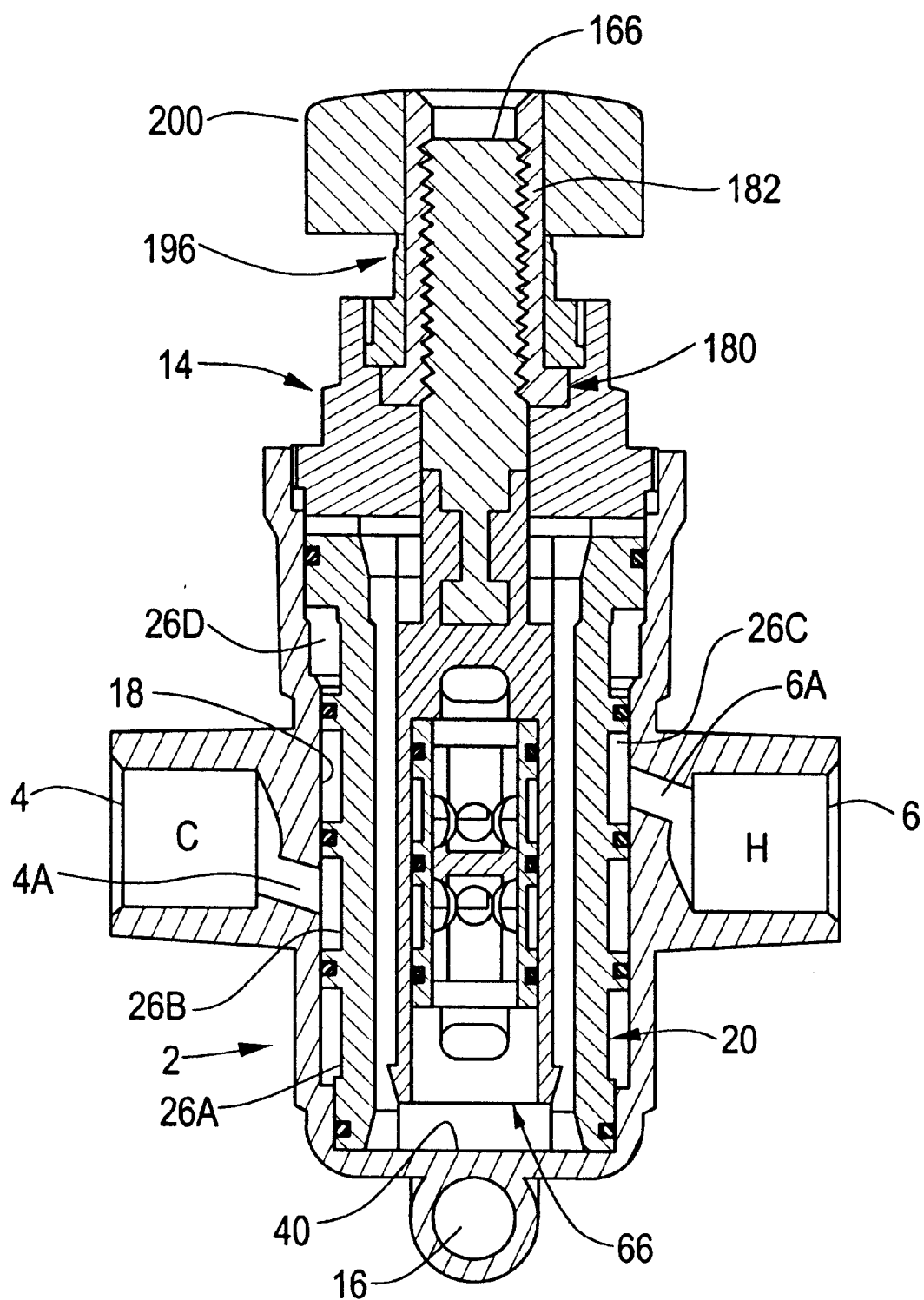
FIG. 5 is sectional view in elevation taken along line 5—5 of FIG. 4.

Referring specifically to FIGS. 4 and 5, the valve body has an internal passageway 16 that connects the two outlet ports 8 and 10. Additionally the valve body has an internal bore 18 which is shaped and sized to accommodate a tubular element 20 that is designed to serve as a mixing chamber. Cold and hot water inlet ports 4 and 6 communicate with bore 18 via openings 4A and 6A respectively (see FIG. 5). Internal passageway 16 also communicates with bore 18 via cold and hot water outlet openings 16A and 16B respectively (see FIG. 4).

Figure 6:
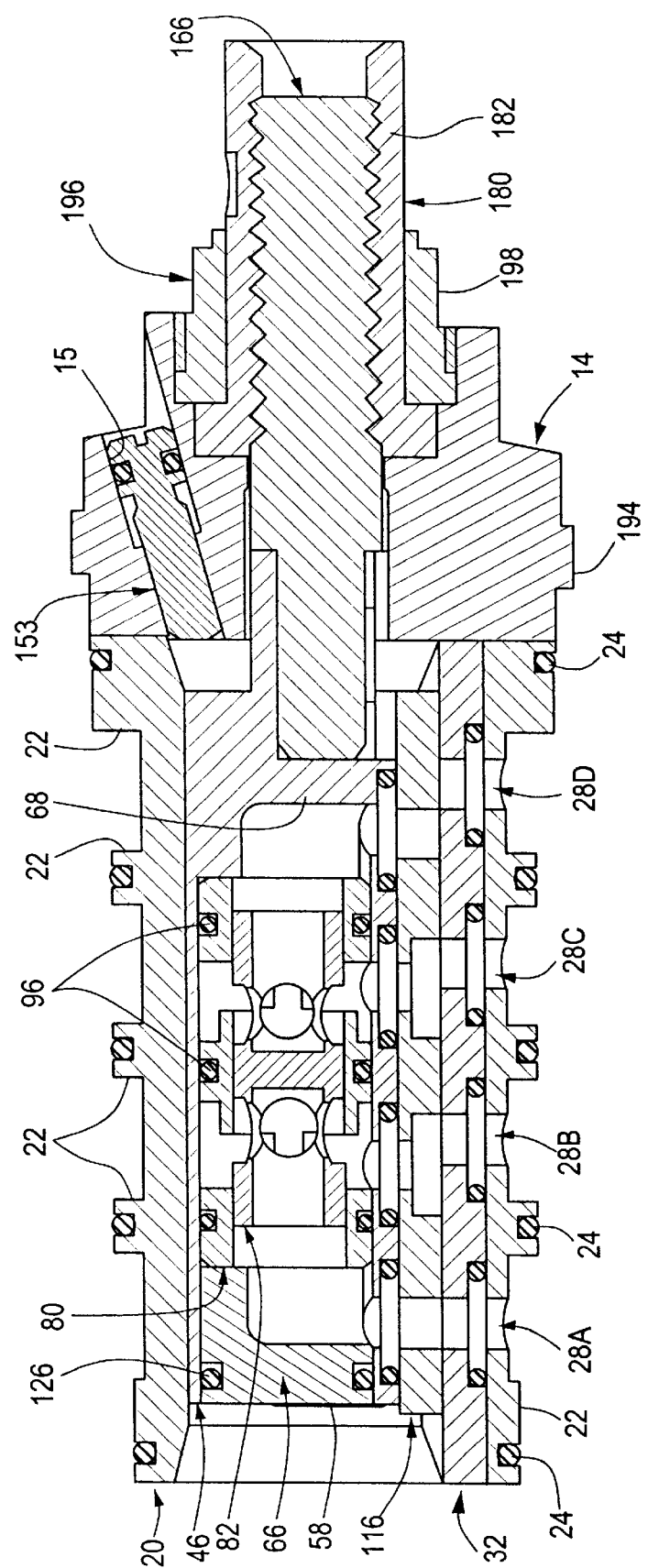
FIG. 6 is a longitudinal sectional view on an enlarged scale showing details of the assembly constituting, inter alia, the mixing chamber, spindle and the pressure balancing piston.
Figure 7:
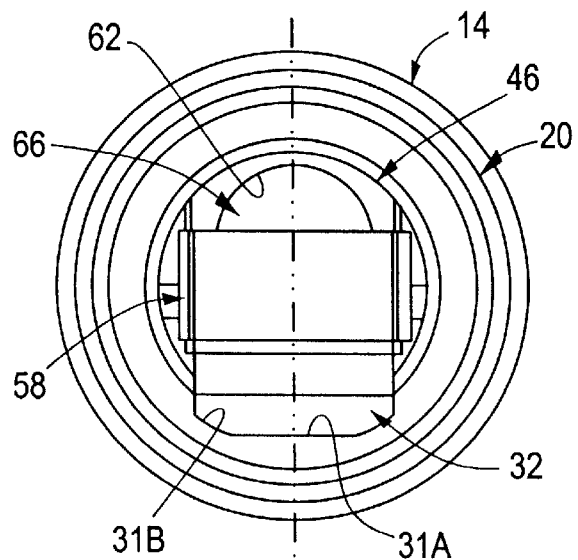
FIG. 7 is an end view of the assembly of FIG. 6.
Figure 8:
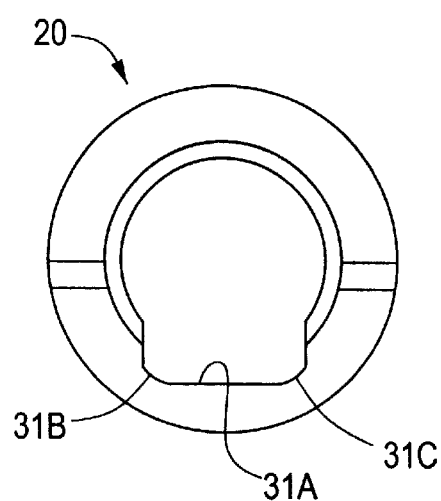
FIG. 8 is a forward end view of the mixing chamber.

As seen best in FIGS. 6–8, mixing chamber element 20 is circular in cross-section and has a plurality of relatively circumferential ribs 22 that in turn have circumferential grooves in which are mounted resilient O-ring seals 24. As seen in FIGS. 4 and 5, the rear (inner) end of mixing chamber element 20 is seated against an inner partition 40 that closes off the inner end of the valve body's internal bore 18, and the O-rings 24 engage the inner cylindrical surface that defines bore 18 and thereby serve to prevent leakage of water between ribs 22. Accordingly the ribs 22 cooperate with the cylindrical surface of the valve body that defines bore 18 to form four annual flow channels or chambers 26A–26D. The two channels 26B and 26C are aligned with valve body cold and hot water inlet openings 4a and 6A respectively and serve as inlet water flow chambers, while the other two channels 26A and 26D are aligned with the valve body cold and hot water outlet openings 16A and 16b respectively and serve as outlet water flow chambers. Mixing chamber element 20 has four circumferentially elongated openings 28A–28B in its side wall that communicate with flow channels 26A–26D respectively. Openings 26B and 26C act as cold and hot water inlet ports respectively, and openings 26A and 26D act as cold and hot water transfer ports respectively. Hence cold and hot water can flow from valve body inlet openings 4A and 6A into the interior of mixing chamber member 20 via channels 26B and 26C and ports 28B and 28C respectively. Additionally water can flow from the interior of mixing chamber member 20 into passageway 16 via ports 28A and 28D, channels 26A and 26D and cold and hot water outlet openings 16A and 16B respectively.

The inside of mixing chamber element 20 is a constant diameter bore, except that it is enlarged by a longitudinally extending groove 30 (FIG. 8) and its opposite ends are tapered to facilitate insertion of components hereinafter described. Referring to FIGS. 7 and 8, the base of groove 30 is a flat surface 31A, and at each of its longitudinal side edges that flat surface is joined to a narrow surface section 31B that extends outwardly at an acute angle to it. Groove 30 serves to accommodate a ceramic stator 32 which is described later in greater detail. The forward (or outer) end surface of element 20, i.e., the end surface nearest valve cap 14, also is formed with two mutually aligned eccentric projections or ribs 34 that are sized to make a close fit in a pair of eccentric slots 36 formed in the inner end of valve cap 14.

Disposed within bore 18 is a balancer porting block 46. As seen best in FIGS. 10–15, the outer side of block 46 comprises a pair of flat oppositely disposed surfaces 48A, 48B, a third flat surface 50 that extends at a right angle to and joins surfaces 48A, 48B, and a curved fourth surface 52 that extends between and joins surfaces 48A, 48B. At the inner end of porting block 46 the surfaces 48A, 48B are terminated by slanted projections 56 that serve as anchor ledges for a spring clip 58 (see FIGS. 6, 7 and 18). Clip 58 has hook-shaped ends 60 that are shaped to firmly grasp projections 56.

Figure 12:
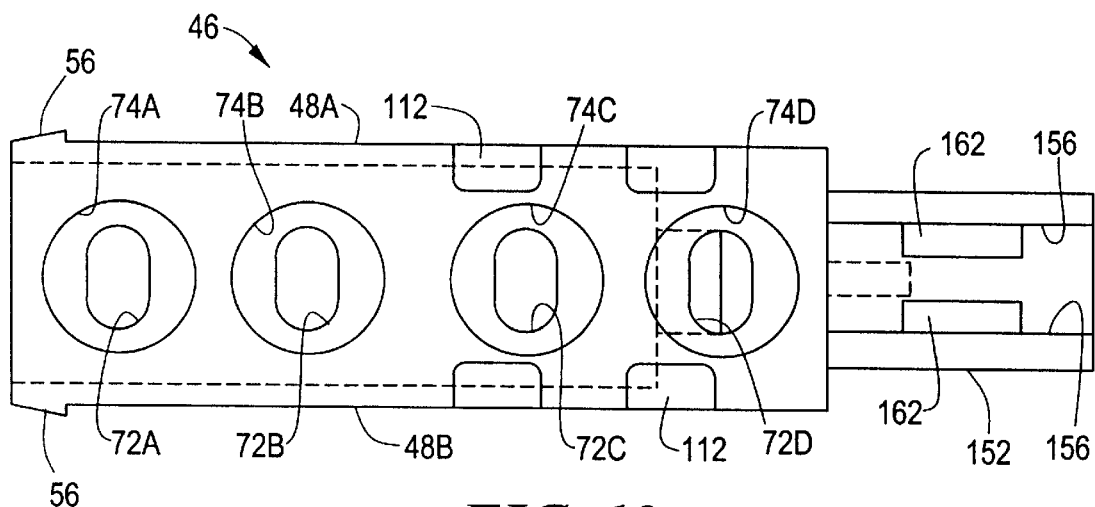
FIG. 12 is a bottom view of the balancer porting block.
Figure 13:
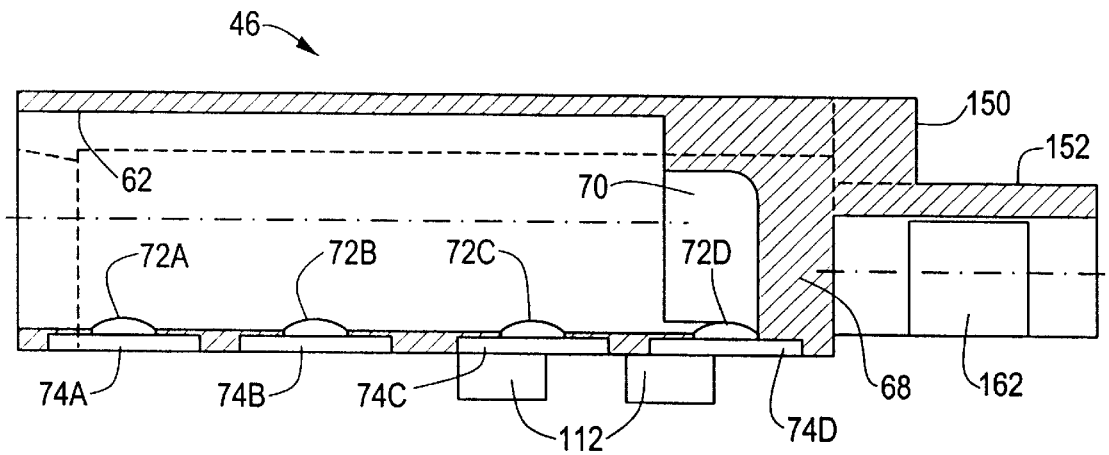
FIG. 13 is a longitudinal sectional view of the balancer porting block
Figure 14:
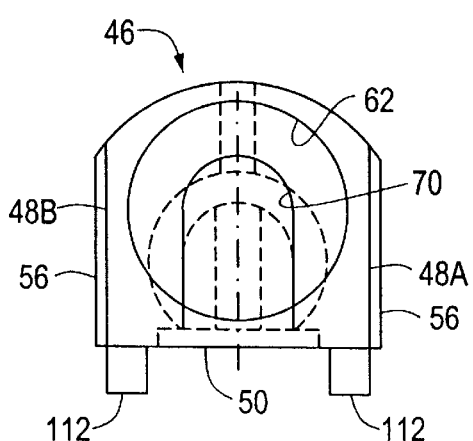
FIG. 14 is a back end view of the balancer portion block.
Figure 15:
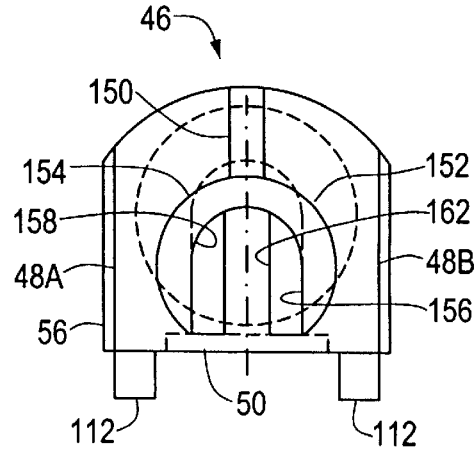
FIG. 15 is a front end view of the balancer porting block.

Porting block 46 has a cylindrical bore 62 that is formed with an open inner end but is closed off by a seal plug 66 (FIGS. 4–6, 16 and 17). Clip 58 serves to retain seal plug 66 in place in the inner end of bore 62. The outer end of bore 62 is closed off by an end wall 68. The latter is formed with a cavity 70 (FIG. 13) that connects with bore 62. Bore 62 and cavity 70 are formed with mutually aligned side orifices or ports 72A–72D (FIGS. 12, 13) that extend through the flat outer surface 50. Preferably ports 72A–72D are elongated transversely of the axis of the porting block, as illustrated in FIG. 12. The flat surface 50 is interrupted by circular depressions 74A–74D that surround ports 72A–72D and serve as seats for O-rings seals 76 (FIG. 6).

Referring to FIGS. 6, 19 and 20, disposed in bore 62 is a sleeve 80 that surrounds and serves as a guide for a pressure-balancing piston 82. Sleeve 80 comprises three cylindrical annular sections 84 A–C. Section 84B has cylindrical opposite end extensions 86 having a reduced outer diameter. However, the inner diameters of section 84B, including its extensions 86, is identical to that of sections 84A and 84C. Sections 84A and 84B are connected to one another by three parallel arms 88 that are spaced from another about the longitudinal axis of the sleeve so as to form three equally-spaced radial ports 90A that communicate with the interior of annular sections 84A and 84B. Sections 84B and 84C are similarly connected by three additional arms 88 so as to form three additional equally spaced radial ports 90B (FIG. 19) that communicate with the interior of annular sections 84B and 84C. Each of the sections 84A–C is provided with a peripheral groove 94 to accommodate a seal in the form of a resilient O-ring 96 (FIG. 6). The O-rings 96 engage the internal surface that defines bore 62 and serve to prevent water from leaking out from between the sleeve and porting block 46. Sleeve 80 is retained in bore 62 by action of plug 66 which also holds keeps it in engagement with end wall 68.

Turning now to FIGS. 6 and 21, the balancing piston 82 comprises two hollow cylindrical end sections 100A, 100B, a solid center section 102, and two hollow cylindrical connecting sections 104A, 104B that have a smaller diameter than sections 100A and 100B. The opposite end surfaces of sections 100A, 100B and 102 are all flat and extend at a right angle to the piston's longitudinal axis. The connecting sections 104A and 104BB are formed with a plurality of circumferentially spaced holes 106A and 106B respectively that serve as cold and hot water inlet ports respectively. Preferably but not necessarily, sections 104A and 104B each have four equally spaced inlet ports 106A and 106B as shown. The internal bores 108A and 108B of end sections 100A and 1000B serve as cold and hot water outlet ports respectively. The outside diameters of sections 100A, 100b and 102 are identical and are sized to make a sliding fit in sleeve 80 that is close enough to prevent little or no water from passing between those sections and sleeve 80, yet not so close as to prevent the piston from moving axially in the sleeve under a relatively small differential water pressure, e. 0.5 psi. The diameters of the internal bores 108A, 108B of sections 100A and 100B are identical, as are the areas of the internal surfaces 110A and 110B of section 102. Consequently if the hot and cold water pressures applied to the piston via cold and hot water inlet ports 106A and 106B are equal, the piston will remain stationary in sleeve 80.

Referring again to FIGS. 10–15, projecting from surface 50 of the porting block are four rectangular posts 112, two adjacent each side surface 48A and 48B. Posts 112 serve to locate a ceramic slider 116 (FIGS. 6, 22 and 23) and cause it to move axially with the porting block. Slider 116 is a flat ceramic member that is generally rectangular but is formed with two rectangular slots 120 at each side which are sized to make a substantially close fit with posts 112. Slider 116 also is formed with four ports or orifices 122A–122D that are elongated transversely to the slider's longitudinal axis. These ports are spaced from one another by the same amount as the ports 72A–72D of balancer porting block 46. One face of slider 116 has two depressions 124 that are elongated in the direction of its longitudinal axis and surround ports 122B and 122C.

The slider is engaged with the porting block so that the depressions 124 face away from the porting block. When the slider is so disposed, its ports 122A–122D are aligned with ports 72A–72D of the porting block. In this connection it should be noted that seal plug 66 has a peripheral groove 125

(FIG. 16) that accommodates an O-ring seal 126 (FIG. 6) that makes a tight seal with the inner porting block surface that defines bore 62, and also that it has a radially extending cavity 128 on its inner side that extends out to its periphery. The purpose of cavity 128 is to facilitate flow of water through porting block port 72A. Accordingly plug 66 is oriented in the porting block so that its cavity 128 is aligned radially with port 72A.

Turning now to FIGS. 24 and 25, the stator 32 is a flat rectangular member having opposite side surfaces 130 and 132, with the stator being chamfered at the edges of side surface 132 so as to provide surfaces 140 that are slanted at the same angle as the surfaces 31B of groove 30. The stator makes a close fit in groove 30, with its surface 132 lying flat against groove surface 31A. The stator is provided with four orifices or port holes 142A–142D that are spaced from one another exactly like ports 122A–122D of slider 116. These holes are all elongated transversely of the longitudinal axis of the stator. Additionally the surface 132 has four circular depressions 144A–144D that surround ports 142A–42D respectively. Seated in these depressions are O-ring seals 146 (FIG. 6). The stator is disposed so that the side with the depressions 144A–144D faces the inner surface of the mixing chamber element 20. The thickness of the O-ring seals 76 of the porting block and the O-ring seals 146 of stator 32 are sized so that the former are compressed between the porting block and the slider 116, and the latter are compressed between the stator and the mixing chamber element 20, with the result that the two sets of O-rings act as springs to keep the mutually confronting surfaces of the slider and stator fully and evenly engaged with one another at all times. In this connection it should be noted that, as shown in FIG. 4, the inner end of the stator lies tight against the inner partition 40 of the valve body when the valve is fully assembled, while its outer end is captivated by valve cap 14. The mutually engaging faces of stator 32 and slider 116 are ground (lapped) flat to within 4 helium light bands so as to provide an intimate face seal whereby no water can pass between them while allowing the slider to move axially relative to the stator.

Referring now to FIGS. 6, 10–15 and 26, the outer end of porting block 46 has two extensions 150 and 152 that extend parallel to the block's longitudinal axis. Extension 150 is positioned to be engaged by a stop screw 153 that is screwed into a threaded section 17 (FIG. 9) of an inclined bore 15 in valve cap 14. when screw 153 is in the retracted position shown in FIG. 6, outward movement of the porting block is limited by engagement of extension 150 with valve cap 14. However, when screw 153 is turned so as to intrude into mixing chamber element 20, outward movement of the porting block is limited by engagement of extension 150 with screw 153.

The second extension 152 has a circularly curved outer surface 154 that extends through an angle of about 300 degrees, and an inner surface that comprises a pair of mutually spaced flat side sections 156 and a circularly curved center section 158 which coact to form a channel 160. However, the two side sections 156 are formed with like mutually confronting flat projections 162 that have square edges as shown and serve as retaining lugs for an elongate actuating member 166. As shown in FIG. 26, actuating member 166 is a lead screw and comprises a cylindrical externally threaded lead screw section 168 and a porting block connecting section 170. The latter also is cylindrical, except that intermediate its ends it has two diametrically opposed notches characterized by oppositely facing flat bottom surfaces 172 and flat side surfaces 174.

The porting block connecting section 170 interlocks with the second extension 152 of the porting block. The interlocking connection is made by inserting the connecting section 170 into the channel 160, with the notched portion of the connecting section having its flat surfaces 172 disposed between and parallel to the projections 162 and end portion 176 of the connecting section 170 being captivated between projections 162 and the adjacent end face of end wall 68. As a result the porting block and the actuating member 166 are releasably coupled together so that the porting block cannot rotate or move axially relative to the actuating member 166.

Figure 9:
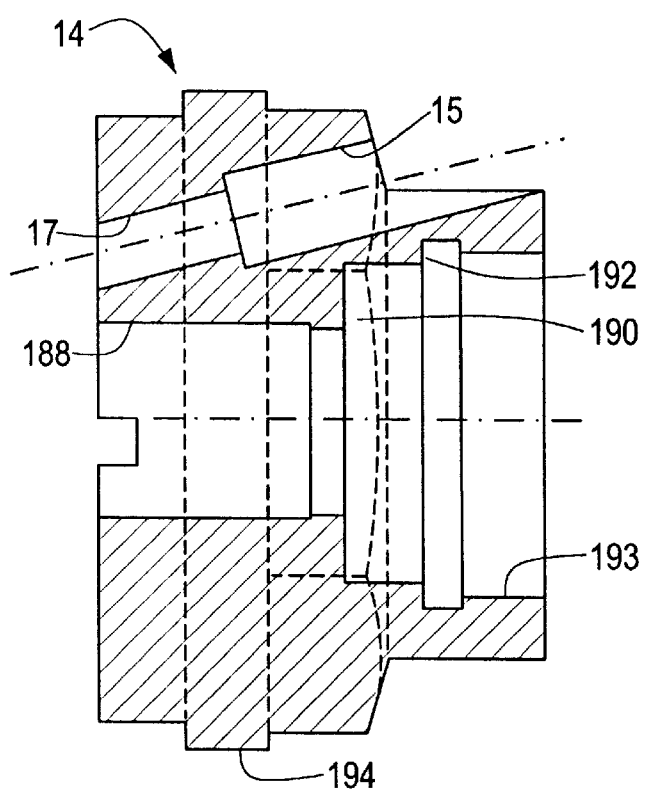
FIG. 9 is an axial sectional view of the valve cap.
Figure 10:
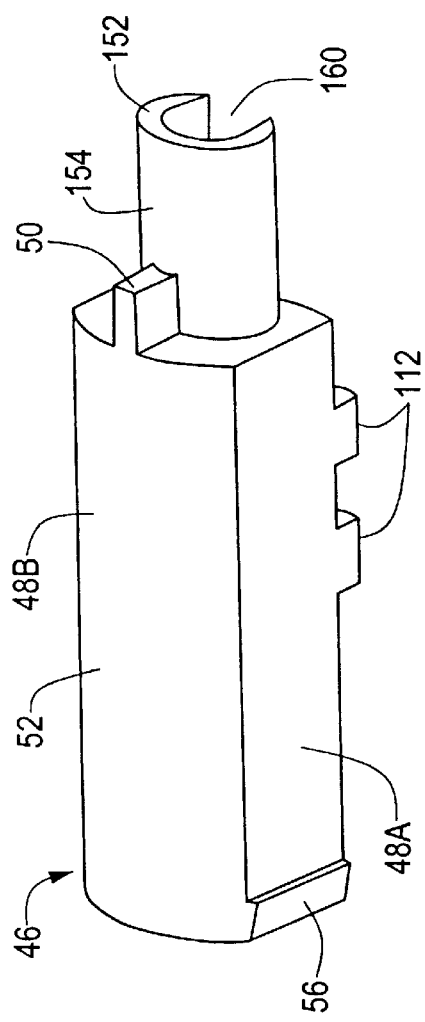
FIG. 10 is a perspective view of the balancer porting block.
Figure 11:
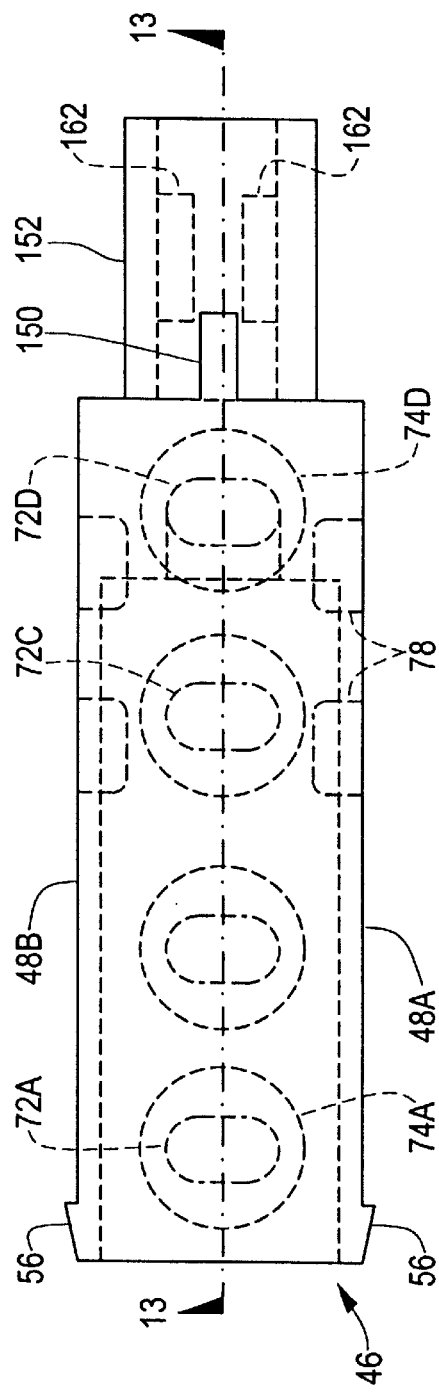
FIG. 11 is a plan view of the balancer porting block.

Referring now to FIGS. 6, 9 and 27, screwed on the actuating member 166 is a valve-operating stem 180. The latter constitutes a hollow cylindrical body 182 that is internally threaded to mate with the external screw thread of actuating member 166, plus an external flange 184 at its inner end. Valve cap 14 has a center bore 188 and actuating member 166 and stem 180 extend out though that center bore. As seen best in FIG. 9, center bore 188 has two counterbores that form annular shoulders 190 and 192. Additionally the outer end of center bore 188 has an increased internal diameter so as to provide an inner surface 193 that has a screw thread for making a screw thread connection with a stem retainer member 196 (FIG. 9) that has an external screw thread at its inner end . It should be noted also that the outer surface of valve cap 14 has an enlarged diameter section 194 with a screw thread in its outer cylindrical surface to permit the cap to be screwed into the threaded valve body opening 12. The outer end of the stem retainer has a smaller outside dimension and its exterior surface 198 has a hexagonal shape in cross-section to permit the retainer to be tightened or loosened by means of a wrench. The stem retainer is screwed into the valve cap far enough for its inner end surface to engage the outer internal shoulder 192 of the valve cap. When the stem retainer is in this position, the flange 184 of stem 180 is captivated between valve cap shoulder 190 and the inner end of the stem retainer, with the spacing between the inner end surface of the stem retainer and the shoulder 190 being set so that flange 184, and hence stem 180, is prevented from moving axially relative to the valve body while being free to rotate to cause actuator member 166 to move axially so as open or close the valve.

Figure 1:
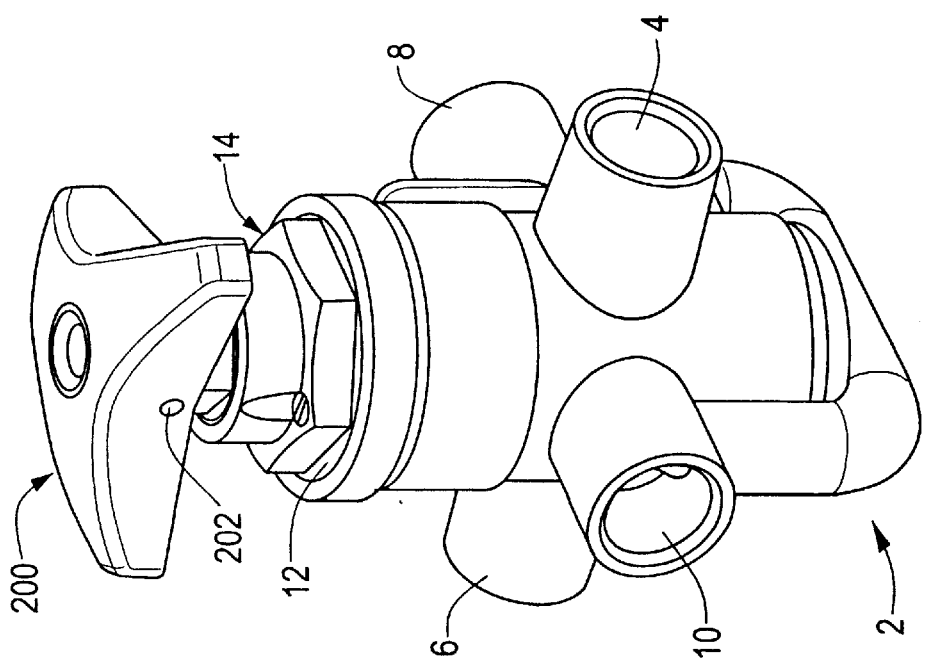
FIG. 1 is a perspective view in elevation of a mixing valve constituting a preferred embodiment of the invention.
Figure 3:
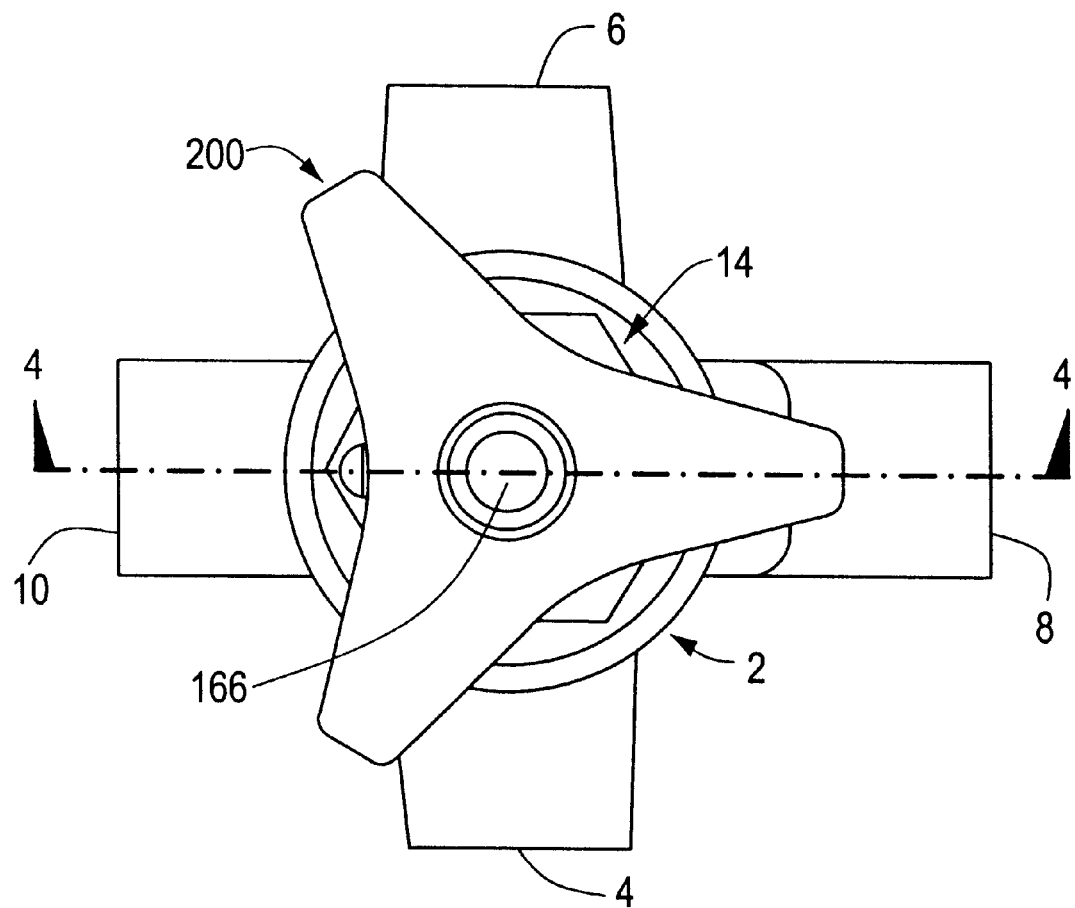
FIG. 3 is a plan view of the same valve.

As seen in FIGS. 1 and 2, a handle 200 is affixed to the outer end of stem 180 for the purpose of turning it in one direction or the other to vary the cold and cold water mix. The handle has a threaded opening in which is screwed a set screw 202 (FIG. 1) that is used to secure the handle to the stem. As seen in FIG. 27, the stem has a depression 204 in its outer surface that is elongated lengthwise of the stem. This depression is sized to receive the inner end of set screw 202, whereby to releasably lock the handle to the stem. The depression is elongated as shown so as to permit some adjustment of the axial position of the handle on the stem.

Operation of the valve is straightforward. Cold and hot water are introduced through ports 4 and 6 of the outer body 2 into the annular chambers 26B and 26C respectively formed by the body and mixing chamber member 20. Then the cold and hot water flows through ports 28B and 28C into the orifices 142B and 142C of stator 32, through ports 84B and 84C of slider 116 and ports 26A and 26b of the porting block, ports 90A and 90b of sleeve 80 and openings 106a and 106b of the piston into the cold and hot water chambers of piston 82. The cold and hot water outlet flow paths are through piston ports 108A and 108B, the opposite ends of sleeve 80, porting block ports 74A and 74D, slider orifices 122A and 122D, stator orifices 142A, 142D, mixing chamber member ports 28A and 28D and valve body outlet openings 16A and 16B to mixed water outlet ports 8 and 10.

Figure 30:
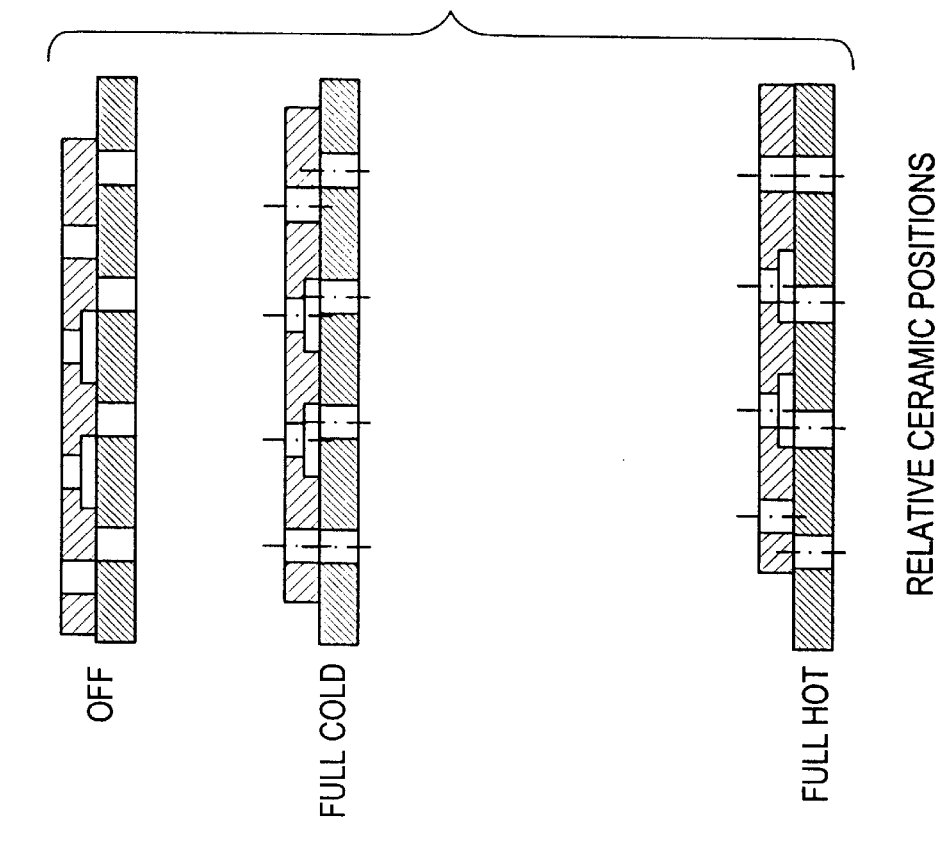
FIGS. 29 and 30 are diagrams showing the relative positions of the ceramic slider and stator as the valve handle is turned to vary the flow from "Off" to "Full Hot".
Figure 29:
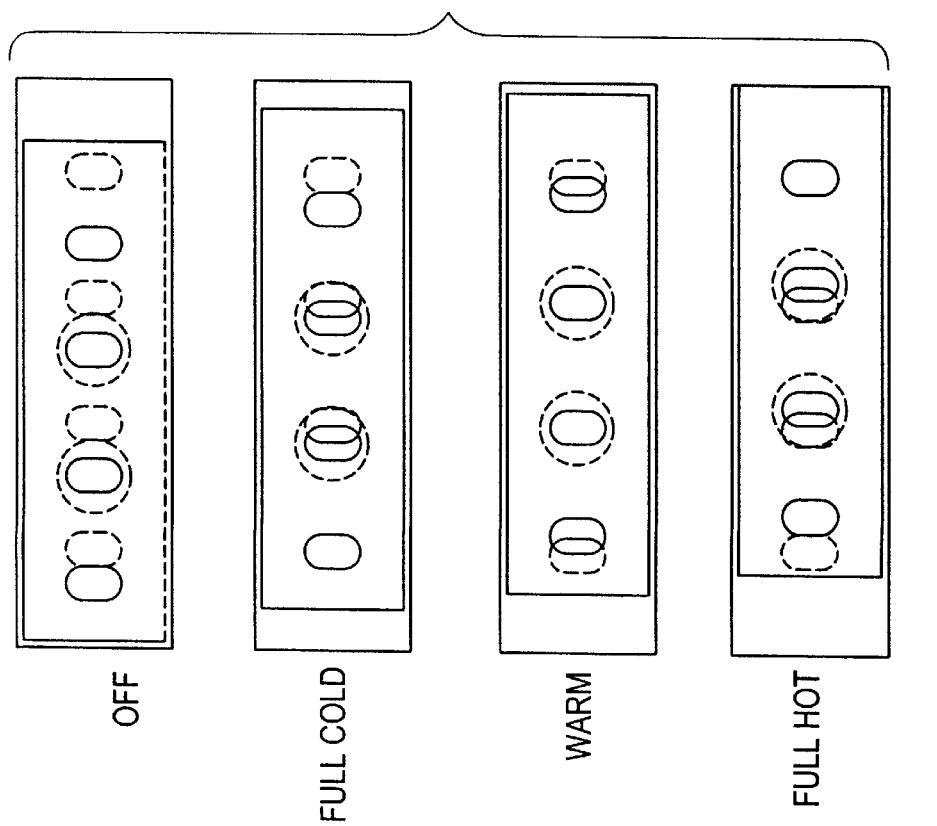

Referring to FIGS. 29 and 30, in the extreme "Off" position the ceramic pair 32 and 116 act to positively shut off cold and hot water flow. As the spindle-piston assembly carrying slider 116 is moved outwardly away from internal partition 40, both the hot and cold water inlet ports are opened simultaneously, applying full line pressure to the both sides of the piston. In the "Full Cold." position flow is constrained to flow only through the cold water side ceramic ports while the hot water side ceramic inlet port is still fully blocked. Further movement of the spindle-piston assembly in the same direction allows hot water to begin to flow into the valve via the stator and slider water inlet ports, producing a mixed water output from the valve. Movement of the spindle-piston assembly away from internal partition 40 causes the ceramic stator/slider pair to modulate the hot to cold mixing ratio, with the ratio of hot to cold water increasing with continued movement in the same direction.

As the spindle-piston assembly is moved to its furthest position, i.e., to the "Full Hot" position, the slider blocks the stator's cold water outlet port while the hot water outlet port is fully opened.

The invention offers a number of advantages. First of all, it provide a novel pressure-balancing non-scald mixing valve that improves on prior designs by employing ceramic elements to provide both the shut-off function and the temperature-ratioing function. A second advantage is that it comprises a spindle-balancing piston subassembly that can be easily removed from and inserted into the valve body. More specifically, the porting block, sleeve, shuttle and ceramic slider are contained within a cylindrical part, the "mixing chamber", and that subassembly is removable and replaceable as a unit "cartridge" from the body of the valve. This enables the outer body to be plumbed up permanently, as in a shower stall, permitting the replacement of the inner subassembly alone. A further advantage is that the two ceramic elements are essentially flat plates that enable a relatively simple valving arrangement and offer the promise of lower costs coupled with long useful life. Still another advantage is that the valve components may be made from a variety of materials. It is preferred, but not essential that the outer body 2, valve cap 14, mixing chamber element 20, and stem retainer 196 be made of brass, and actuating member 166 be made of stainless steel. However, a number of the internal parts may be plastic moldings, e.g., porting block 46, plug 66, and stem 180 may be made of a variety of plastic materials. Mixing chamber element 20 also could be made of a suitable plastic.

It should be noted that the valve may be modified in various ways without departing from the essence of the invention. For one thing, the invention is not restricted to valves of the type herein described and illustrated but may be used also in valves that do not incorporate pressure-balancing pistons. In this connection, it should be noted that the valve herein described and illustrated may be converted to a non-pressure-balancing mixing valve by (1) by removing piston 82 and its guiding sleeve 80 and (2) providing porting block 46 with an internal partition in bore 62 between the openings 72B and 72C so as to subdivide the interior of the porting block into two chambers, namely, a cold water chamber comprising outlet and inlet openings 72A and 72B respectively and a hot water chamber comprising inlet and outlet openings 72C and 72D respectively. In the mixing valve resulting from such a modification the two ceramic plates will function as previously described to provide full shutoff control and to vary the mixture of hot and cold water discharged from the outlet port(s) of the valve body. Also the valve body may be simplified by providing it with a single outlet port, thereby eliminating the need for the outlet passageway 16. The sizes and number of certain of the ports or orifices also may be modified without changing the mode of operation of the invention. It should be noted also that the locations of the inlet and outlet orifices may be changed, e.g., the relative positions of the inlet and outlet orifices of the stator and slider may be reversed. A further obvious modification is to integrate porting block 46 and lead screw actuating member 166 by molding them together as a single component. This modification offers the advantage of reducing the number of parts and a possible lowering of manufacturing costs, while the two-piece arrangement shown in the drawings tend to permit greater mechanical tolerances and the ability to manufacture the porting block and the lead screw actuating member of different materials. Another possible modification is to adapt the valve for remote control. Such a modification would involve eliminating handle 200 and coupling stem 180 to a remotely controlled and reversible electromechanical driver device, e.g., a device comprising a reversible electric motor and a motion transmitting mechanism in the form of a gear train having an input gear driven by the motor and an output gear affixed to stem 180, whereby operation of the motor will cause rotation of stem 180 in a direction determined by the direction of operation of the motor and the form of the gear train.

Still other modifications will be obvious to persons skilled in the art from the preceding detailed specification and the drawings.

What is claimed is:

1. A mixing valve comprising in combination:

a hollow body having first and second inlet ports, at least one outlet port, and a valve opening;

first and second inlet chambers communicating with said first and second inlet ports, said inlet chambers being spaced from one another lengthwise of said hollow body;

first and second outlet chambers communicating with said at least one outlet port, said outlet chambers being spaced from one another lengthwise of said hollow body;

cylinder means providing a liquid mixing chamber in said body, said cylinder means extending lengthwise of said body and including first ceramic means defining cold and hot water inlet orifices that open into said mixing chamber and communicate with said first and second inlet chambers respectively and cold and hot water transfer orifices that open into said mixing chamber and communicate with said first and second outlet chambers respectively; said inlet and transfer orifices being spaced from one another lengthwise of said mixing chamber;

a porting block disposed in said liquid mixing chamber said porting block being movable axially in said mixing chamber and having an internal chamber, said porting block including second ceramic means slidably engaged with said first ceramic means, said second ceramic means defining cold and hot water inlet and cold and hot water outlet orifices that open into said internal chamber, said cold and hot water inlet and outlet orifices of said second ceramic means being spaced from one another lengthwise of said mixing chamber and disposed so as to be shifted by axial movement of said porting block into and out of varying degrees of alignment with said cold and hot water inlet and transfer orifices respectively of said first ceramic means, whereby to vary the flow of hot and cold water through said mixing chamber;

a balancing piston slidably disposed in said internal chamber, said balancing piston having cold and hot water chambers, cold and hot water inlet orifices leading to said cold and hot water chambers respectively and communicating with said cold and hot water inlet orifices respectively of said second ceramic means, and cold and hot water outlet orifices leading from said cold and hot water chambers respectively and communicating with said cold and hot water outlet orifices of said second ceramic means respectively, whereby said piston will move in one direction or the other in accordance with the pressure differential of the cold and hot water supplied to its cold and hot water chambers via cold and hot water inlet orifices respectively of said first and second ceramic means; and means for selectively moving said porting block in one direction or the other lengthwise of said mixing chamber so as to vary the relative rates of flow of cold and hot water through said valve via said first and second ceramic means.

2. A mixing valve comprising in combination:

a valve body having cold and hot water supply ports, at least one mixed water outlet port and an axial opening;

a hollow member disposed inside said valve body in alignment with said axial opening, said hollow member defining a mixing chamber and having cold water inlet and transfer ports and hot water inlet and transfer ports, with said cold and hot water inlet ports communicating with said cold and hot water supply ports and said transfer ports communicating with said at least one mixed water outlet port;

a ceramic stator disposed within and extending lengthwise of said mixing chamber, said stator being locked against movement in said mixing chamber, said stator having hot and cold water inlet orifices communicating with said cold and hot water inlet ports and cold and hot water outlet orifices communicating with said cold and hot water transfer ports;

a balancing piston porting block disposed within and movable bidirectionally lengthwise of said mixing chamber, said porting block having an internal chamber and four side orifices communicating with said internal chamber;

a ceramic slider mounted to and movable with said porting block and slidably engaged with said stator, said slider having a cold water inlet orifice, a cold water exit orifice, a hot water inlet orifice, and a hot water exit orifice aligned with first, second, third and fourth ones of said four side orifices;

a pressure-balancing piston disposed within and slidable bidirectionally along said internal chamber of said porting block, said piston having cold and hot water side inlet ports and cold and hot water end outlet ports, said piston being movable within limits in said internal chamber so that the degree that its said cold and hot water side inlet ports are aligned with the cold and hot water inlet orifices of said slider is a function of the pressures of the hot and cold water supplied to said mixing chamber cold and hot water inlet ports, and said cold and hot water outlet ports of said piston being in communication with said cold and hot water exit orifices of said slider;

an actuating member coupled to said porting block and extending through said axial opening, said actuating member having an externally threaded portion;

a hollow internally threaded stem surrounding and in a screw thread-mating relationship with the externally threaded portion of said actuating member;

a stem retaining means attached to said valve body for permitting rotational but not axial movement of said stem so that rotation of said stem will cause said actuating member and said porting block to move axially according to the direction of rotation of said stem, with such movement causing the cold and hot water inlet orifices and the cold and hot water exit orifices of said slider to move into and out of varying degrees of alignment with the hot and cold water inlet orifices and the cold and hot water outlet orifices respectively of the stator, including a first porting block position whereby at least the cold and hot water inlet orifices of the slider are blocked by portions of said stator so as to present a fully "Off" condition, a second porting block position whereby the cold and hot water inlet orifices of the slider are aligned with the cold and hot water inlet orifices of the stator and the cold water exit orifice of the slider is at least partially aligned with the cold water outlet orifice of the stator but the hot water exit orifice of the slider is blocked by a portion of the stator so as to present a full cold water flow condition, and a third porting block position in which the cold and hot water inlet orifices of the slider are aligned with the cold and hot water inlet orifices respectively of the stator, the cold water exit orifice of the slider is blocked by portions of the stator and the hot water exit orifice of the slider is aligned with the hot water outlet orifices of the stator so as to present a full hot water flow condition.

3. A valve according to claim 2 wherein said slider and stator having mutually engaging surfaces that have a flatness of 4 helium light bands.

4. A valve according to claim 2 wherein said stem is adapted to receive an operating handle.

5. A valve according to claim 2 wherein said axial opening is threaded, and further including a valve cap that is screwed into said axial opening, said valve cap surrounding and rotatably supporting said actuating member.

6. A valve according to claim 5 wherein said stem retaining means is an annular collar that surrounds said stem and is connected to said valve cap by a screw connection.

7. A valve according to claim 6 wherein said valve cap has a first inner cylindrical surface that closely surrounds said actuating member and a second inner cylindrical surface that is spaced radially from said actuating member, and further wherein said annular collar extends between said stem and said second inner cylindrical surface and is connected to said second inner cylindrical surface by a screw thread connection.

8. A valve according to claim 7 wherein said stem has a peripheral flange that is captivated between said collar and an annular surface of said valve cap.

9. A valve according to claim 2 wherein said actuating member is connected to said porting block by an interlocking of portions of said actuating member and said balancing piston block.

10. A valve according to claim 2 wherein said internal chamber of said porting block is formed with an open end, and further including a plug disposed within and sealing off said open end.

11. A valve according to claim 10, further including a spring clip releasably attached to said porting block for retaining said plug in place in said open end.

12. A valve according to claim 2 further including a valve cap surrounding and rotatably surrounding said actuating member, and further wherein said hollow member that defines said mixing chamber is retained in said valve body by said valve cap.

13. A valve according to claim 12 further including means carried by said valve cap for limiting axial movement of said porting block in said mixing chamber.

14. A valve according to claim 12 wherein on its outer side said hollow member has a plurality of mutually spaced circumferentially-extending ribs and four relatively wide grooves located between adjacent ribs, with each rib having a relatively narrow circumferential groove that is occupied by an O-ring that engages a surrounding wall of said valve body, whereby said relatively wide grooves and the surrounding valve body wall cooperate to define four annular water flow chambers.

15. A valve according to claim 14 wherein each of said cold and hot water inlet and transfer ports of said hollow member is aligned with a different one of said annular flow chambers.

16. A valve according to claim 2 further including a slide bearing in the form of a sleeve open at both ends that is disposed in said internal chamber of said porting block, said sleeve having side ports that are aligned with said side orifices of said balancing piston block, and further including means for preventing axial movement of said sleeve relative to said balancing piston block, and further wherein said balancing piston is slidably disposed in said sleeve for relative reciprocal axial motion.

17. A valve according to claim 16 wherein said means for preventing axial movement of said sleeve includes a plug that closes off one end of said internal chamber, said plug also acting to limit movement of said piston in a first direction.

18. A valve according to claim 2 wherein said balancing piston block is locked against rotation on its longitudinal axis while being free to be moved axially by said actuating member.

19. A valve according to claim 18 further including a valve cap that is screwed into said axial opening, said valve cap surrounding and rotatably supporting said actuating member, and further wherein said hollow member is held in place in said valve body and prevented from rotating relative to said valve body by a key/keyway connection with said valve cap.

20. A valve according to claim 2 further including adjustable means for limiting axial movement of said porting block in said mixing chamber.

21. A hot and cold water mixing valve comprising a valve body having first and second inlet ports for hot and cold water respectively and at least one outlet port for discharging a mixture thereof, a first stationary ceramic valving member disposed in said valve body, said first ceramic valving member having first and second inlet openings communicating with said first and second inlet ports respectively and first and second outlet openings communicating with said at least one outlet port, a second ceramic valving member movably disposed in said valve body in sliding contact with said first ceramic valving member, said second ceramic valving member having first and second inlet orifices for admitting hot and cold water passing through said first and second inlet openings into a chamber in said valve body and first and second outlet orifices for passing hot and cold water from said chamber to said first and second outlet openings, and operating means for moving said second ceramic valving member relative to said first ceramic valving member so as to vary the degree of alignment of at least said first and second inlet orifices with said first and second inlet openings, whereby to vary the relative amounts of hot and cold water flowing into said chamber so as to alter the temperature of said mixture.

22. A hot and cold water mixing valve according to claim 21 wherein said ceramic valving members are flat plates, and further including resilient means urging said first and second ceramic valving members into intimate face-to-face contact with one another.

23. A hot and cold water mixing valve according to claim 22 wherein said ceramic valving members are elongate and said operating means comprises an actuating member that projects out of and is rotatable relative to said valve body, and means connecting said actuating member to said second ceramic valving member for causing said second ceramic valving member to move lengthwise relative to said first ceramic valving member in response to rotation of said actuating member.

24. A hot and cold water mixing valve according to claim 21 wherein said two chambers are formed in part by a pressure balancing valve member that is slidably disposed in said valve body for regulating the flow of hot and cold water passing from said first and second inlet orifices through said chambers to said first and second outlet orifices in response to relative changes in the pressures of the hot and cold water supplied to said first and second inlet ports respectively, so as to maintain said mixture at a substantially uniform temperature despite said relative changes in hot and cold water pressures.

25. A hot and cold water mixing valve comprising a valve body having first and second inlet ports for hot and cold water respectively and at least one outlet port for discharging a mixture thereof, a first stationary elongate ceramic valving member disposed in said valve body, said first ceramic valving member having first and second inlet openings communicating with said first and second inlet ports respectively and first and second outlet openings communicating with said at least one outlet port, a second elongate ceramic valving member movably disposed in said valve body in sliding face-to-face contact with said first ceramic valving member, said second ceramic valving member having first and second inlet orifices for admitting hot and cold water passing through said first and second inlet openings into a chamber in said valve body and first and second outlet orifices for passing hot and cold water from said chamber to said first and second outlet openings, a pressure balancing valve member disposed in said chamber for regulating the flow of hot and cold water passing from said first and second inlet orifices through said chamber to said first and second outlet orifices so as to maintain said mixture at a substantially uniform temperature despite relative changes in the pressures of the hot and cold water supplied to said first and second inlet ports respectively, said hot, and operating means for moving said second ceramic valving member relative to said first ceramic valving member so as to vary the degree of alignment of at least said first and second inlet orifices with said first and second inlet openings, whereby to vary the relative amounts of hot and cold water flowing into said chamber so as to alter the temperature of said mixture.

26. A mixing valve consisting of a body with hot water and cold water inlet ports and at least one outlet port, and valving means inside said body for selectively (a) positively shutting off flow of hot and cold water from both of said inlet ports to said at last one outlet port, and (b) varying the relative amount of hot and cold water flowing from said inlet ports to said at least one outlet port, said valving means including a pair of ceramic valving elements each comprising a cold and hot water inlet orifices and cold and hot water outlet orifices, said ceramic valving elements being disposed in face-to-face engagement with one another and also slidable relative to one another, with said orifices being disposed so that by relative sliding movement of said elements (a) the inlet hot and cold water orifices of one element may be entirely blocked off by the other element so as to prevent inflow of hot and cold water or may be aligned with the inlet hot and cold water orifices of the other element so as to allow inflow of hot and cold water, and (b) while the inlet hot and cold orifices of the two elements are aligned with one another so as to permit inflow of hot and cold water, the hot and cold water outlet orifices of one element may be moved into varying degrees of alignment with the hot and cold water outlet orifices of the other element so as to vary the mixture of hot and cold water discharged from said at least one outlet port.

27. A mixing valve according to claim 26 further including means projecting out of said body for moving one of said elements relative to the other of said elements along an axis that extends parallel to said elements.

28. For use in a hot and cold water mixing valve, a pair of flat ceramic valving plates, one of said plates having mutually aligned and spaced first, second, third and fourth orifices disposed along its length in the order named, and a counterbore for each of said orifices on one side of said one plate, and the other of said plates having mutually aligned and spaced first, second, third and fourth mutually aligned holes disposed along its length in the order named, and a counterbore for said third and fourth holes on one side of said other plate, said orifices and holes being spaced so that when said plates are mutually aligned and disposed in face to face contact with one another one of said plates is movable relative to the other through four different positions as follows: a first in which all of said orifices are fully blocked by imperforate portions of said other plate, a second position in which only said fourth orifice is fully blocked by an imperforate portion of said other plate and the remaining orifices are in at least partial registration with said first, second and third holes, a third position in which said first, second, third and fourth orifices are in at least partial registration with said first, second, third holes and fourth holes respectively, and a fourth position in which said first orifice is fully blocked by an imperforate portion of said other plate and said second, third and fourth orifices are in at least partial registration with said second, third and fourth holes respectively.

29. A pair of ceramic valving elements for use in a mixing valve, each of said ceramic valving elements comprising cold and hot water inlet orifices and cold and hot water outlet orifices, said ceramic valving elements each having a smooth flat surface on one side thereof for making an intimate and leak-resistant sliding engagement with one another, and said orifices being disposed so that by relative sliding movement of said elements (a) the inlet hot and cold water orifices of one element may be entirely blocked off by the other element so as to prevent flow of hot and cold water through said inlet and cold water orifices of said one element, or may be aligned with the inlet hot and cold water orifices of the other element so as to of hot and cold water through said inlet hot and cold water orifices of both said valving elements, and (b) while the inlet hot and cold orifices of said two elements are aligned with one another so as to permit flow of hot and cold water through said hot and cold water inlet orifices of both said valving elements, the hot and cold water outlet orifices of said one element may be moved into varying degrees of alignment with the hot and cold water outlet orifices of the other element so as to vary the flow of hot and cold water through said hot and cold water outlet orifices of both said elements.

30. A pair of ceramic valving elements according to claim 29 wherein the said orifices of each element are disposed in series along a selected axis.

\* \* \* \* \*

UNITED STATES PATENT AND TRADEMARK OFFICE
CERTIFICATE OF CORRECTION

PATENT NO.     : 6,263,899 B1
DATED          : July 24, 2001
INVENTOR(S)    : Jerrold Zindler It is certified that error appears in the above-identified patent and that said Letters Patent is hereby corrected as shown below:

Column 12,
Line 37, change "having" to -- have --;

Column 13,
Line 2, change "surrounding" (second occurrence) to -- supporting --;

Column 14,
Line 65, change "last" to -- least --;

Column 15,
Line 2, delete "a";

Column 16,
Line 23, after "to", add -- permit flow --.

Signed and Sealed this

Thirteenth Day of August, 2002

Attest:

Attesting Officer

JAMES E. ROGAN
Director of the United States Patent and Trademark Office

UNITED STATES PATENT AND TRADEMARK OFFICE
CERTIFICATE OF CORRECTION

PATENT NO. : 6,263,899 B1
DATED : July 24, 2001
INVENTOR(S) : Zerrold Zindler

It is certified that error appears in the above-identified patent and that said Letters Patent is hereby corrected as shown below:

<u>Column 14,</u>
Line 54, delete "said hot,".

Signed and Sealed this

Fifth Day of November, 2002

Attest:

JAMES E. ROGAN
Attesting Officer
Director of the United States Patent and Trademark Office